(12) United States Patent
Kubiak et al.

(10) Patent No.: US 10,848,015 B2
(45) Date of Patent: Nov. 24, 2020

(54) BI-MATERIAL INTEGRATED POLEPIECE

(71) Applicant: STEERING SOLUTIONS IP HOLDING CORPORATION, Saginaw, MI (US)

(72) Inventors: David M. Kubiak, Saginaw, MI (US); Joel E. Birsching, Vassar, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 104 days.

(21) Appl. No.: 15/928,804

(22) Filed: Mar. 22, 2018

(65) Prior Publication Data
US 2019/0296593 A1    Sep. 26, 2019

(51) Int. Cl.
*H02K 1/08* (2006.01)
*H02K 15/00* (2006.01)

(52) U.S. Cl.
CPC .............. *H02K 1/08* (2013.01); *H02K 15/00* (2013.01)

(58) Field of Classification Search
CPC .. H02K 1/00; H02K 1/08; H02K 1/27; H02K 1/28; H02K 15/00; H02K 15/12
See application file for complete search history.

(56) References Cited

U.S. PATENT DOCUMENTS

| | | | |
|---|---|---|---|
| 7,898,134 B1* | 3/2011 | Shaw | H02K 1/148 310/112 |
| 2007/0284972 A1 | 12/2007 | Kim | |
| 2008/0054740 A1* | 3/2008 | Kim | D06F 37/304 310/60 R |
| 2014/0035418 A1 | 2/2014 | Horst | |
| 2015/0137655 A1* | 5/2015 | Maekawa | H02K 1/30 310/216.129 |
| 2016/0107681 A1 | 4/2016 | Dutsky | |
| 2017/0107681 A1 | 4/2017 | Kuivamaki et al. | |

FOREIGN PATENT DOCUMENTS

CN    203707891 U    7/2014

* cited by examiner

*Primary Examiner* — Tran N Nguyen
(74) *Attorney, Agent, or Firm* — Dickinson Wright PLLC

(57) ABSTRACT

A method of manufacturing a magnetic pole piece includes molding a magnetic body having an outer wall and an inner wall extending between a first end and a second end, and a trim cap disposed at the first end. The method further includes fixing a non-magnetic isolator to the magnetic body between the outer wall and the inner wall and removing the trim cap.

11 Claims, 4 Drawing Sheets

BI-MATERIAL INTEGRATED POLEPIECE

BACKGROUND

Magnetic pole pieces may be used in magnetic machines such as magnetic actuators. The magnetic pole pieces may have a high torque transmission capability that may be affected by the magnetic field strength between poles of the magnetic pole pieces.

SUMMARY

According to an embodiment of the present disclosure, a magnetic pole piece is provided. The magnetic pole piece includes a magnetic body extending between a first end and a second end along an axis. The magnetic body has an outer wall disposed about an inner wall. The outer wall and the inner wall each extending between the first end and the second end along the axis. A trim cap is disposed at the first end and extends between the outer wall and the inner wall.

According to another embodiment of the present disclosure, a magnetic pole piece is provided. The magnetic pole piece includes a magnetic body and a non-magnetic isolator. The magnetic body extends between a first end and a second end. The magnetic body has an outer wall, an inner wall, and a trim cap. The outer wall is spaced apart from the inner wall. The outer wall and the inner wall extend between the first end and the second end. The trim cap is disposed at the first end and extends between the outer wall and the inner wall. The non-magnetic isolator is disposed at the second end and is disposed between the outer wall and the inner wall.

According to yet another embodiment of the present disclosure, a method of manufacturing a magnetic pole piece is provided. The method includes molding a magnetic body having an outer wall and an inner wall extending between a first end and a second end, and a trim cap disposed at the first end. The method further includes fixing a non-magnetic isolator to the magnetic body between the outer wall and the inner wall and removing the trim cap.

These and other advantages and features will become more apparent from the following description taken in conjunction with the drawings.

BRIEF DESCRIPTION OF THE DRAWINGS

The subject matter of the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting the same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Magnetic pole pieces may be part of a magnetic machine having an energizing source such as an energizing coil to magnetize the pole piece. A permanent magnet located between inner and outer poles may be located in an annular groove that is disposed between the inner and outer poles to generate a torque responsive to being energized. The strength of the magnetic field between the inner and outer poles impacts the torque generated by the magnetic machine. An alternative magnetic path may be provided should a magnetic material connect the inner and outer poles that reduces the magnetic field strength between the inner and outer poles and reduces the output torque of the magnetic machine. Therefore, it is desirable improve the magnetic field strength and ultimately the output torque of the magnetic machine.

Figure 1:
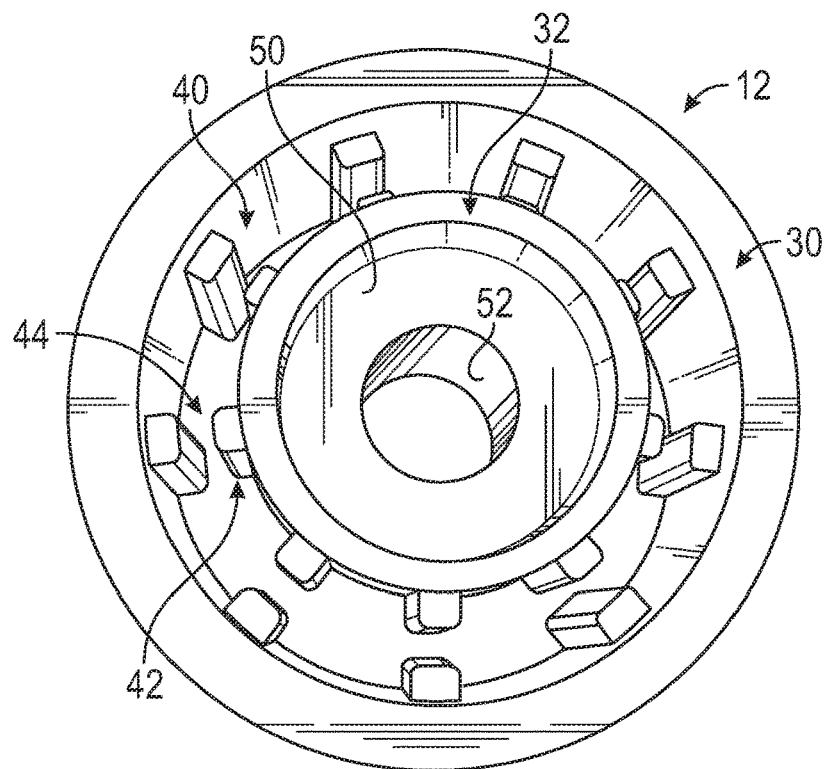
FIG. 1 is an isometric view of a magnetic body of a magnetic pole piece.
Figure 2:
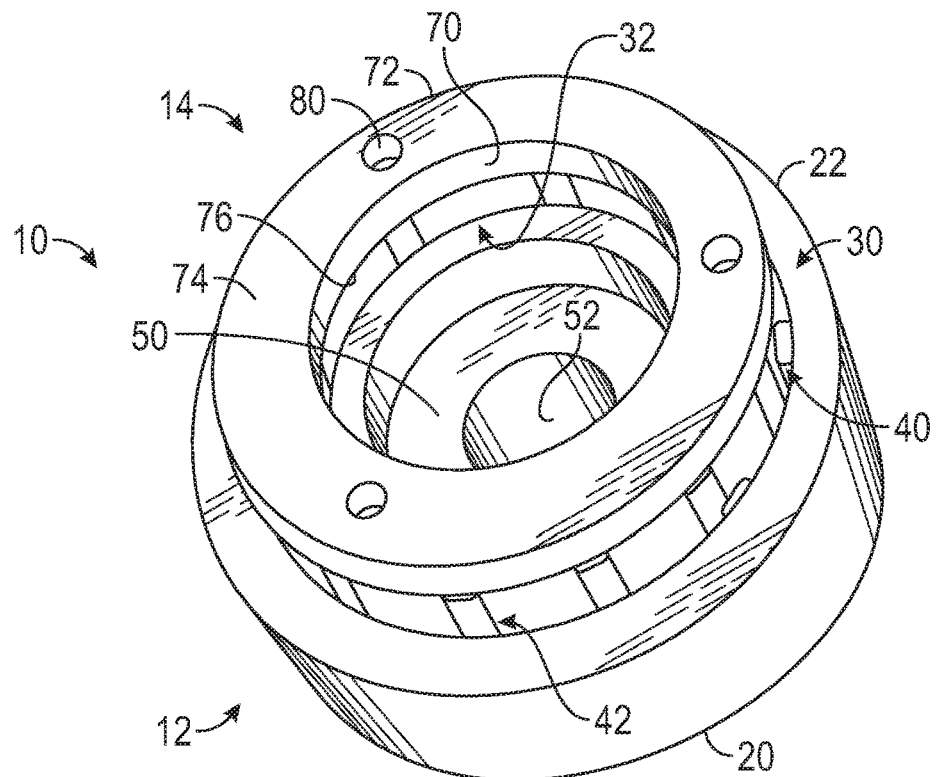
FIG. 2 is an isometric view of a nonmagnetic isolator being inserted into the magnetic body.
Figure 3:
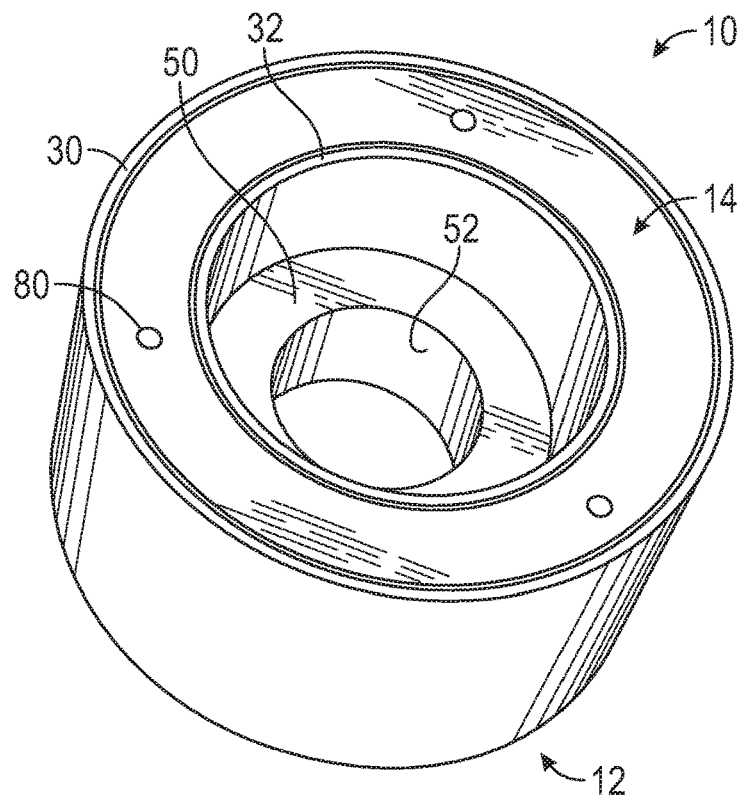
FIG. 3 is an isometric view of the nonmagnetic isolator assembled to the magnetic body.

Referring to FIGS. 1-3, a magnetic pole piece 10 that may be provided with a magnetic actuator, magnetic gear, or other magnetic machine. The magnetic pole piece 10 may be a bi-material integrated magnetic pole piece that includes a magnetic body 12 and a nonmagnetic isolator 14 retained on the magnetic body 12.

Figure 4:
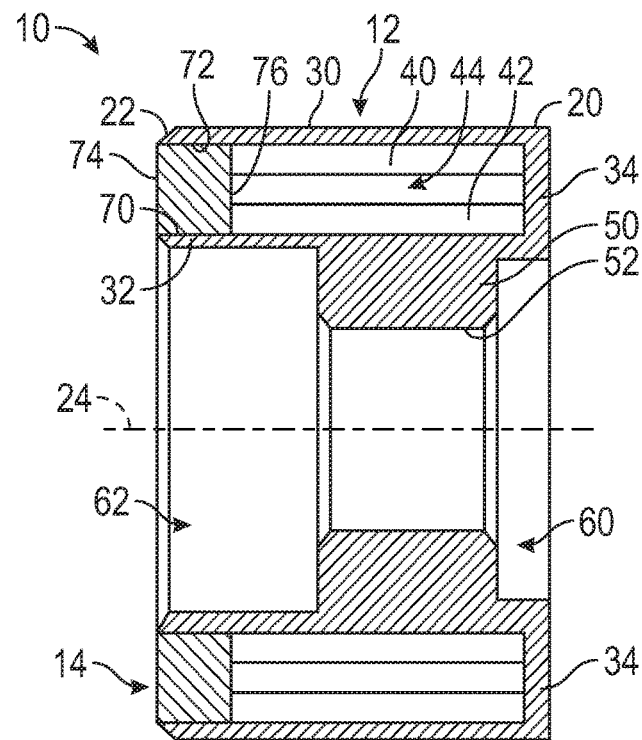
FIG. 4 is a cross-sectional view of the nonmagnetic isolator assembled to the magnetic body.
Figure 5:
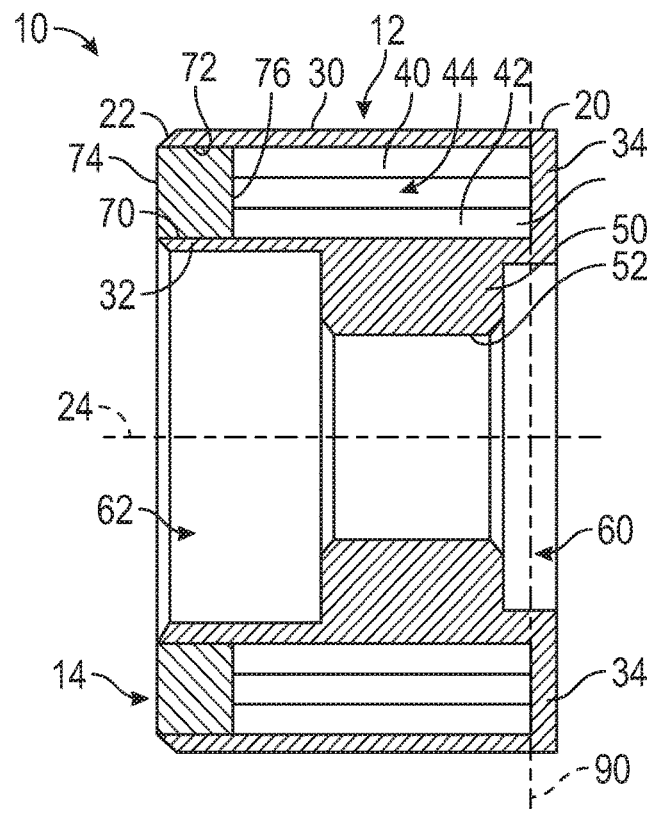
FIG. 5 is a cross-sectional view of the nonmagnetic isolator assembled to the magnetic body identifying a machined surface.
Figure 6:
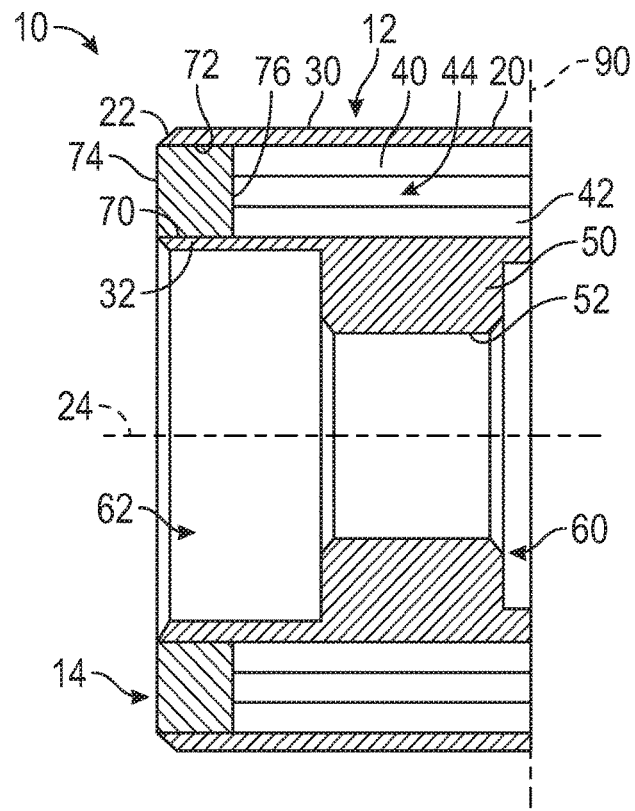
FIG. 6 is a cross-sectional view of the nonmagnetic isolator assembled to the magnetic body after machining.

Referring to FIGS. 4-6, the magnetic body 12 may be a magnetic powder metal component formed by a sintering process. The magnetic body 12 extends between a first end 20 and a second end 22 disposed opposite the first end 20 along an axis 24. The magnetic body 12 includes an outer hub or outer wall 30, an inner hub or an inner wall 32, and an alignment connecting cap or a trim cap 34.

The outer wall 30 is disposed about the inner wall 32. The outer wall 30 extends between the first end 20 and the second end 22 along the axis 24. The outer wall 30 may be connected to the inner wall 32 by the trim cap 34.

The outer wall 30 defines a first plurality of teeth 40 that extend towards the axis 24 and the inner wall 32, as shown in FIGS. 1 and 4-7. The first plurality of teeth 40 are magnetic teeth that define a set of outer poles.

The inner wall 32 is disposed closer the axis 24 than the outer wall 30. The inner wall 32 extends between the first end 20 and the second end 22 along the axis 24. The inner wall 32 is spaced apart from the outer wall 30.

The inner wall 32 defines a second plurality of teeth 42 that extend towards the outer wall 30 and away from the axis 24, as shown in FIGS. 1 and 4-7. The second plurality of teeth 42 are approximately aligned with and spaced apart from the first plurality of teeth 40. The second plurality of teeth 42 are magnetic teeth that define a set of inner poles.

The first plurality of teeth 40 are spaced apart from the second plurality of teeth 42 by a slot or gap 44, within which a permanent magnet or a magnetic component may be inserted. The permanent magnet or the magnetic component may be disposed between the first plurality of teeth 40 are spaced apart from the second plurality of teeth 42.

The inner wall 32 includes an inner support 50 that radially extends towards the axis 24. The inner support 50 axially extends from proximate the first end 20 towards the second end 22. An inner bore 52 may be defined by the inner support 50. The inner bore 52 may have an inner bore diameter.

The trim cap 34 is disposed at the first end 20 of the magnetic body 12 and is disposed about the axis 24. The trim cap 34 radially extends between the outer wall 30 and the inner wall 32 to connect and ensure the radial alignment between the inner poles and the outer poles. The trim cap 34 closes the first end 20 of the magnetic body 12 while the second end 22 is an open end.

The magnetic body 12 may define a first pocket 60 and a second pocket 62. The first pocket 60 may be at least partially defined by the inner wall 32, the trim cap 34, and the inner support 50. The first pocket 60 extends from the first end 20 towards the second end 22. The first pocket 60 has a first pocket diameter.

The second pocket 62 is disposed opposite the first pocket 60. The second pocket 62 may be at least partially defined by the inner wall 32 and the inner support 50. The second pocket 62 extends from the second end 22 towards the first end 20. The second pocket 62 may have a pocket depth that is greater than the first pocket depth. The second pocket 62 may have a second pocket diameter that is greater than the first pocket diameter. The inner bore diameter is less than the first pocket diameter and the second pocket diameter.

The magnetic body 12 having the outer wall 30 provided with the first plurality of teeth 40, the inner wall 32 having the second plurality of teeth 42, and the trim cap 34 may all be molded in a single sintered press mold as one piece, to ensure radial alignment of the inner poles and the outer poles.

Referring to FIGS. 2-6, the nonmagnetic isolator 14 may be made of a nonmagnetic material having low magnetic permeability (e.g. $\mu \leq 1.5$) such as stainless steel, aluminum, aluminum alloys, copper, copper alloys, glass, polymer, elastomeric material, or the like. The nonmagnetic isolator 14 may be a nonmagnetic ring that is fixed to the magnetic body 12. The nonmagnetic isolator 14 may be inserted or pressed into the open end or second end 22 of the magnetic body 12. The nonmagnetic isolator 14 may be fixed and disposed between the outer wall 30 and the inner wall 32. The nonmagnetic isolator 14 may engage at least one of the first plurality of teeth 40 and the second plurality of teeth 42.

The nonmagnetic isolator 14 may be an arcuate member such as a ring having an inner surface 70, an outer surface 72, a first surface 74, and a second surface 76. The inner surface 70 is arranged to engage the inner wall 32. The outer surface 72 is radially spaced apart from the inner surface 70 by the first surface 74 and the second surface 76. The outer surface 72 is arranged to engage the outer wall 30. The inner surface 70 and the outer surface 72 axially extend between the first surface 74 and the second surface 76. The first surface 74 and the second surface 76 radially extend between the inner surface 70 and the outer surface 72. The second surface 76 engages at least one of the first plurality of teeth 40 and the second plurality of teeth 42.

The nonmagnetic isolator 14 may define an opening 80 that extends from the first surface 74 to the second surface 76 and is disposed between the inner surface 70 and the outer surface 72. The opening 80 may be generally aligned with the gap 44. In at least one embodiment, the opening 80 may be generally aligned with another opening 82, as shown in FIG. 7, that is defined by the trim cap 34.

Figure 7:
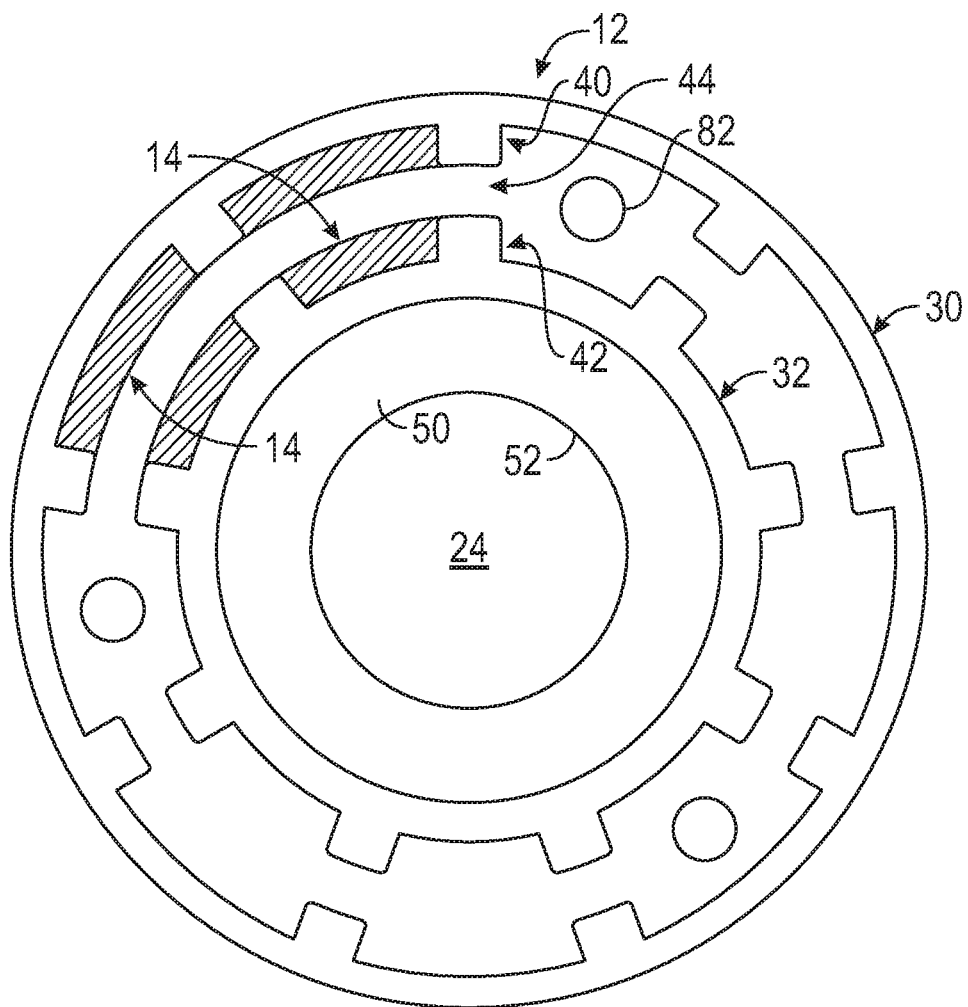
FIG. 7 is a plan view of an alternative nonmagnetic isolator assembled to the magnetic body.

Referring to FIG. 7, an alternate embodiment of the nonmagnetic isolator 14 may be made of a formable or moldable nonmagnetic material, such as a polymer, an elastomer, a putty, or the like, that is formed, poured, placed, or otherwise disposed between adjacent teeth of the first plurality of teeth 40 of the outer wall 30 and/or the second plurality of teeth 42 of the inner wall 32. The nonmagnetic isolator 14 may engage and be joined to an inner surface of the outer wall 30 and a side surface of the adjacent teeth of the first plurality of teeth 40. The nonmagnetic isolator 14 may engage and be joined to an outer surface of the inner wall 32 and a side surface of the adjacent teeth of the second plurality of teeth 42. The nonmagnetic isolator 14 may be shaped to match the contours or shape of the outer wall 30 and/or inner wall 32 of the magnetic body 12 such that the gap 44 is maintained between the first plurality of teeth 40 and the second plurality of teeth 42.

Subsequent to the nonmagnetic isolator 14 being fixed to the magnetic body 12, the trim cap 34 may be removed by a machining process. The trim cap 34 may be trimmed towards or along a trim line 90, as shown in FIGS. 5 and 6. The trim cap 34 may be removed to reduce potential distortion between the inner poles and the outer poles. The machining away of the trim cap 34 opens the first end 20 of the magnetic body 12 while the nonmagnetic isolator 14 closes the second end of the magnetic body 12.

The machining away of the trim cap 34 results in a dimensionally aligned, magnetically isolated sets of pole piece teeth (e.g. the first plurality of teeth 40 and the second plurality of teeth 42) and respective hubs or walls. The isolated sets of pole piece teeth ensures magnetic flow from the inner poles to the outer poles and not through the magnetic body 12 to increase efficiency.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in scope with the present disclosure. Additionally, while various embodiments of the present disclosure have been described, it is to be understood that aspects of the present disclosure may include only some of the described embodiments or combinations of the various embodiments. Accordingly, the present disclosure is not to be seen as limited by the foregoing description.

The invention claimed is:

1. A magnetic pole piece, comprising:
    a magnetic body extending between a first end and a second end along an axis, the magnetic body having an outer wall disposed about an inner wall, the outer wall and the inner wall each extending between the first end and the second end along the axis, the inner wall including an inner support that extends towards the axis; and
    a trim cap disposed at the first end and extends between the outer wall and the inner wall,
    wherein the inner support, the inner wall, and the trim cap define a first pocket, the first pocket having a first pocket depth relative to the axis, the first pocket having a first pocket diameter,
    wherein the inner support and the inner wall define a second pocket that extends from the second end towards the first end, the second pocket having a second pocket depth relative to the axis, the second pocket having a second pocket diameter, wherein the second pocket depth is greater than the first pocket depth, and the second pocket diameter is greater than the first pocket diameter.

2. The magnetic pole piece of claim 1, further comprising:
a non-magnetic isolator disposed at the second end and disposed between the outer wall and the inner wall.

3. The magnetic pole piece of claim 1, wherein the outer wall defines a first plurality of teeth that extend towards the inner wall.

4. The magnetic pole piece of claim 3, wherein the inner wall defines a second plurality of teeth that extend towards the outer wall.

5. The magnetic pole piece of claim 4, further comprising:
a non-magnetic isolator disposed between adjacent teeth of at least one of the first plurality of teeth and the second plurality of teeth.

6. A magnetic pole piece, comprising:
a magnetic body extending between a first end and a second end along an axis, the magnetic body comprising:
an outer wall spaced apart from an inner wall, both extending between the first end and the second end, the inner wall including an inner support that extends towards the axis, and
a trim cap disposed at the first end and extending between the outer wall and the inner wall; and
a non-magnetic isolator disposed at the second end and disposed between the outer wall and the inner wall, wherein the inner support, the inner wall, and the trim cap define a first pocket, the first pocket having a first pocket depth relative to the axis, the first pocket having a first pocket diameter, wherein the inner support and the inner wall define a second pocket that extends from the second end towards the first end, the second pocket having a second pocket depth relative to the axis, the second pocket having a second pocket diameter, wherein the second pocket depth is greater than the first pocket depth, and the second pocket diameter is greater than the first pocket diameter.

7. The magnetic pole piece of claim 6, wherein the outer wall defines a first plurality of teeth that extend towards the inner wall.

8. The magnetic pole piece of claim 7, wherein the inner wall defines a second plurality of teeth that extend towards the outer wall.

9. The magnetic pole piece of claim 8, wherein the non-magnetic isolator engages at least one of the first plurality of teeth and the second plurality of teeth.

10. The magnetic pole piece of claim 8, wherein the first plurality of teeth define outer poles.

11. The magnetic pole piece of claim 8, wherein the second plurality of teeth define inner poles.

* * * * *